United States Patent
Mizuochi et al.

[11] Patent Number: 6,010,070
[45] Date of Patent: Jan. 4, 2000

[54] CODE READING DEVICE AND METHOD WITH VARIABLE LIGHT SIGNAL STORAGE TIME

[75] Inventors: Hideki Mizuochi; Shinji Taguchi; Yasunori Eda, all of Tokyo, Japan

[73] Assignee: Nippon Electric Industry Co., Ltd., Tokyo, Japan

[21] Appl. No.: 08/946,946

[22] Filed: Oct. 9, 1997

[30] Foreign Application Priority Data

Jun. 16, 1997 [JP] Japan ................................. 9-175268

[51] Int. Cl.⁷ ...................................... G06K 7/10
[52] U.S. Cl. .................. 235/455; 235/454; 235/462.41; 235/462.25
[58] Field of Search .............................. 235/455, 462.06, 235/462.11, 462.24, 462.27, 462.41, 462.25, 454; 250/214 AG, 566

[56] References Cited

U.S. PATENT DOCUMENTS

| | | | |
|---|---|---|---|
| 4,701,626 | 10/1987 | Ishizaki et al. ................... | 250/214 AG |
| 5,406,062 | 4/1995 | Hasegawa et al. ................. | 235/455 X |
| 5,572,006 | 11/1996 | Wang et al. ..................... | 235/462.06 X |
| 5,754,670 | 5/1998 | Shin et al. ........................... | 235/455 X |
| 5,773,807 | 6/1998 | Barkan et al. ................. | 235/462.27 X |
| 5,784,102 | 7/1998 | Hussey et al. ................. | 235/462.11 X |
| 5,814,802 | 9/1998 | Hecht et al. ............................ | 235/455 |

FOREIGN PATENT DOCUMENTS

| | | |
|---|---|---|
| 63-225884 | 9/1988 | Japan . |
| 6-236452 | 8/1994 | Japan . |

*Primary Examiner*—Donald Hajec
*Assistant Examiner*—Jared J. Fureman
*Attorney, Agent, or Firm*—Jordan and Hamburg LLP

[57] ABSTRACT

In a method for optically reading a label carrying information recorded thereon using a charge coupled device, a storage time of an incident light signal in the charge coupled device is changed to effect proper reading. The light signal storage time is changed until the charge coupled device reads the code, and then the light signal storage time is fixed. Thereby, a code is read without failure by effectively preventing reading error or failure due to an excessively light or dark environment, or varying distance between the code and code reader. Thus, a code is correctly read regardless of whether the code is close or far.

10 Claims, 2 Drawing Sheets

CODE READING DEVICE AND METHOD WITH VARIABLE LIGHT SIGNAL STORAGE TIME

BACKGROUND OF THE INVENTION

The present invention relates to a method and apparatus for optically reading codes using a charge coupled device, and is especially related to a method for reading a code label in a stable manner whether positioned far or near and a code reader for effecting the code reading.

Various kinds of code readers have been developed and used for reading code symbols recorded on code labels. For instance, a typical bar-code reader is known which comprises a light emitting device, such as light emitting diode (LED) or the like, and a photo detecting device such as a charge coupled device (CCD). In this bar-code reader, a predetermined light is emitted from the light emitting device toward a bar code label carrying a bar code provided thereon, and the incident light is reflected by the bar code label toward the photo detecting device through an image-forming lens or the like. The detected light is converted into a predetermined electric signal and coded information on the bar code label is thus read.

Usually in such bar-code readers an amount of light incident upon the CCD varies from one bar code label to another. To compensate for the variation of the light amount, any of the following is adopted:

(1) gain (amplification factor) of an analog signal stored in the CCD is initially set to have an optimal large margin; or (2) an automatic gain control (AGC) circuit is provided to automatically control the gain according to a light amount reflected from a bar code label.

Therefore, depending upon external factors such as ambient brightness, distance between a bar code label and bar-code reader, and an orientation of the bar-code reader, the signal level in such bar-code readers will change greatly in connection with the light amount and focal distance of the CCD. Even if an optimum gain is set, the bar-code reader is likely to fail in correctly reading the information on the bar code.

The bar-code reader provided with an AGC circuit also suffers a deficiency in that if a dark and light pattern, having a high reflectance, exists near a bar code on a label and a reflected light from the pattern is incident upon the bar-code reader which is correctly directed toward the bar code label, the pattern is sometimes mistaken for a bar code by the bar-code reader. Thus, no optimum gain control is possible. The provision in the bar-code reader of an AGC circuit, which is a complicated analog circuit, also also increases manufacturing costs and dimensions of the bar-code reader.

SUMMARY OF THE PRESENT INVENTION

Accordingly, the present invention has an object to provide a method and apparatus for reading codes in a stable manner by effectively preventing incorrect reading caused by ambient brightness, focal distance, etc., and, thus, to read codes on labels near or far.

The present invention provides a method for optically reading a label, carrying information recorded thereon, using a charge coupled device in which a storage time of an incident light signal is adjustable, comprising the steps of changing the light signal storage time in the charge coupled device until the charge coupled device reads the label, and then fixing the light signal storage time.

Also, the present invention provides an apparatus for optically reading a label, carrying information recorded thereon, using a charge coupled device in which a storage time of am incident light signal is adjustable, comprising a means of discriminating whether the charge coupled device reads the label, a means of changing the light signal storage time until the charge coupled device reads the label, and a controlling means for fixing the light signal storage time using an output signal from the discriminating means indicating that the charge coupled device reads the label.

According to the present invention, a stable, successful reading is always assured by detecting an optimum light signal storage time for an ambient brightness and focal distance.

These objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
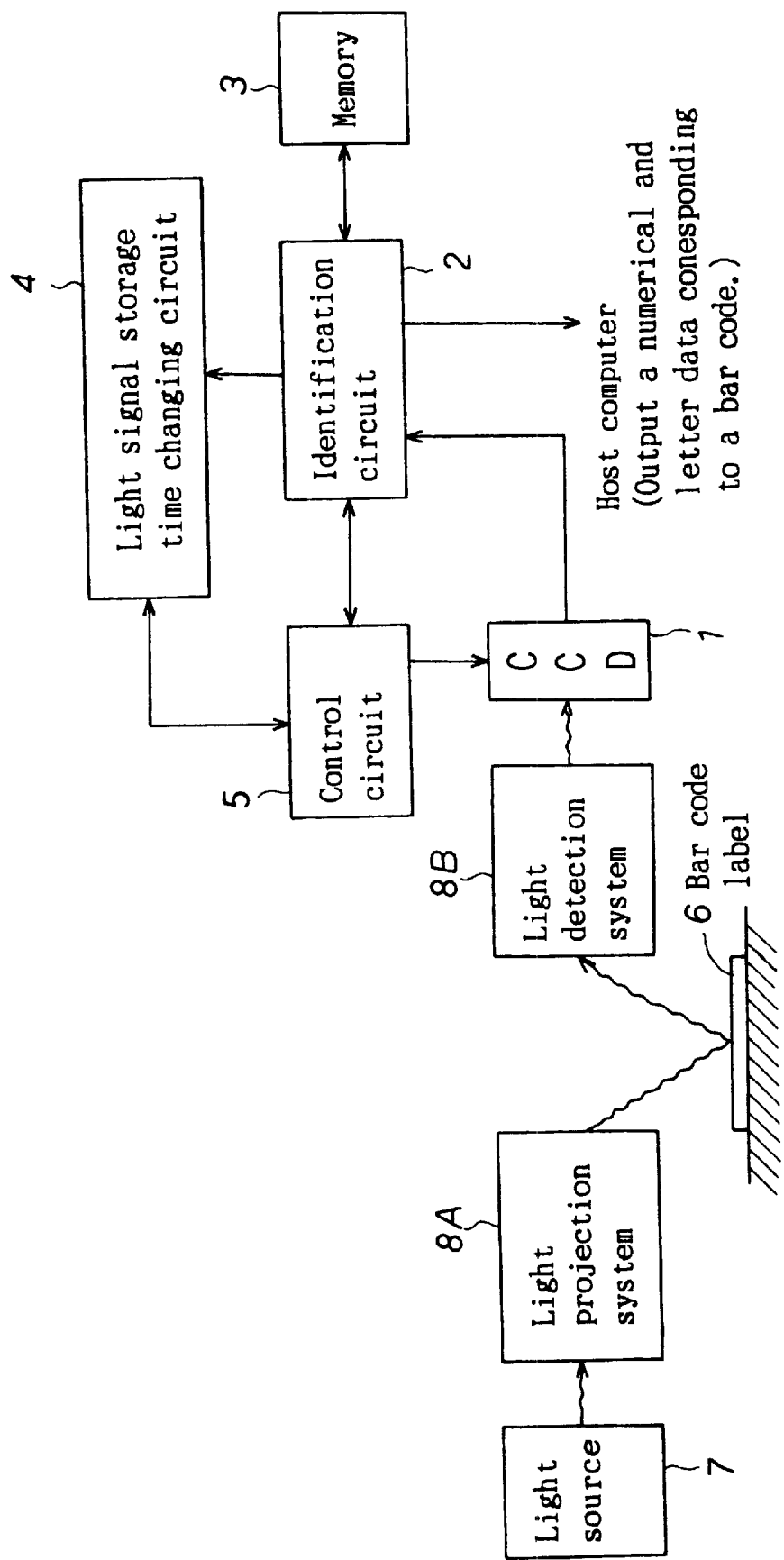
FIG. 1 is a block diagram showing a configuration of a bar-code reader according to the present invention.

Referring to FIG. 1 a bar-code reader according to the present invention includes a charge coupled device (CCD) 1, identification circuit 2, memory 3, light-signal storage time changing circuit 4, and a control circuit 5. The reference numeral 6 in FIG. 1 indicates a bar code label.

The CCD 1 is so designed that storage time of incident light signal is adjustable and it is controlled by the control circuit 5. In the illustrated embodiment, the light signal storage time in CCD 1 is settable to one of five time intervals, t1 to t5 (t1<t2<t3<t4<t5). Namely, one of these five time intervals for storage time is selected eventually for reading a bar code label, for example, one attached to merchandise. Initially the first time interval t1 is is selected in the illustrated embodiment. It is understood that the use of the five time intervals for storage time of the illustrated embodiment are exemplary, and the present invention is not limited to such settings and the storage time may be set to a greater number intervals.

To discriminate if the CCD 1 correctly reads the label, the identification circuit 2 comprises an A/D conversion circuit which converts an analog signal of a bar code delivered from the CCD 1 into a digital signal and a decoder circuit which decodes the digital signal to thereby identify (check characters) the bar code based on the decoded data (array of numerals or the like). Namely, the identification circuit 2 compares the data read by the CCD 1 with a variety of data patterns of previously stored bar codes in the memory 3. More particularly, it is checked if the read data (converted into an array of numerals and letters) is coincident with any previously stored data (array of numerals and letters). When a light incident upon the CCD 1 is identified to be from a bar code label, it is decided that the CCD 1 is correctly reading the information from the label. Namely, the identification circuit 2 identifies whether an object toward which the bar-code reader is directed is a bar code label or not and judges whether CCD 1 cogently reads the bar code label. The memory 3 has previously stored therein many numerals and letter patterns for a variety of bar codes for making the determination.

The light signal storage time changing circuit 4 is provided to change the time of light signal storage in the CCD 1 until a bar code recorded on the bar code label 6 can be read. In this embodiment, the storage time is set to one of the five time intervals (t1 for the first storage time, t2 for second storage time, t3 for third storage time, t4 for fourth storage time, and t5 for fifth storage time). The storage times t1 to t5 rotate cyclically in an automatic manner in an order from t1→t5→t2→t4→t3. However, the present invention is not limited to this rotation of the storage times. Alternative sequences include an arrangement may be made that the storage times rotate sequentially in an ascending numerical order from t1 to t5 or in a descending numerical order from t5 to t1.

The waveform of the analog signal output from the CCD 1 is proportionally increased in amplitude in accordance with the length of the storage time. The control circuit 5 controls operation of the light signal storage time changing circuit 4 in accordance with an output signal from the identification circuit 2 to fix the time of light signal storage in the CCD 1. The control circuit 5 fixes the storage time when an "OK" signal is delivered from the identification circuit 2. When an "NG" signal is supplied from the identification circuit 2, the control circuit 5 automatically rotates, or changes, a selected one of the light signal storage times (predetermined ones) sequentially using a time changing signal supplied from the light signal storage time changing circuit 4. An identification operation is repeated for each currently set storage time.

Figure 2:
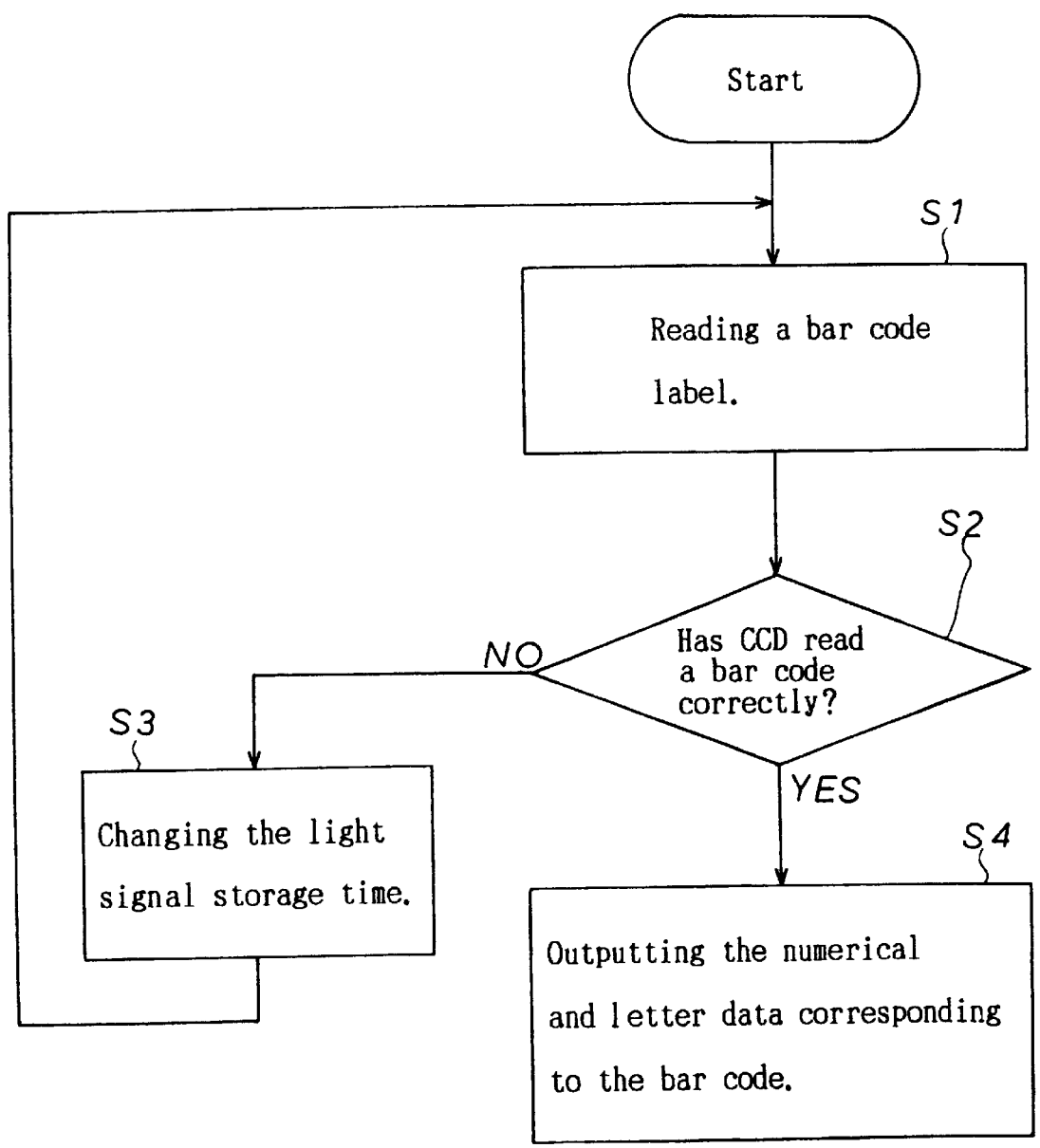
FIG. 2 is a flow chart of a bar-code reading process according to the present invention.

Referring to FIG. 2, a method for reading bar codes using the bar-code reader of the above-mentioned embodiment according to the present invention includes the following four steps S1 to S4. In a first step S1, the bar code label 6 is read by the bar-code reader. When the start switch (not shown) is turned on, a bar-code reading will start. A light is emitted from a source 7 and collected via an appropriate light projection system 8A. The collected light is projected onto the bar code label 6 which will reflect it. The reflected light is incident upon a light detection system 8B. The light passes through the light detection system 8B and then is incident upon the CCD 1.

In a second step S2, it is judged whether the CCD 1 properly reads the bar code. A digital signal is produced by A/D conversion, that corresponds to the bar code, from charges stored in the CCD 1 and supplied to the identification circuit 2. In the identification circuit 2 the digital signal is output by an A/D converter and compared and checked with patterns corresponding to all the bar codes previously stored in the memory 3. If the digital signal is not coincident with any of the patterns, a predetermined signal is supplied sequentially to the light signal storage time changing circuit 4 and also an "NG" signal is supplied to the control circuit 5.

In a third step S3, the light signal storage time is changed. Supplied with a signal from the identification circuit 2, the change circuit 4 provides the control circuit 5 with change signals for the storage times in a predetermined order. As a result, the time of light signal storage in the CCD 1 is changed with a control signal from the control circuit 5. Next, a control signal is supplied from the control circuit 5 to repeat a similar storage time changing procedure. Namely, the operations of the steps S1 and S2 are repeated.

In a fourth step 4, if the signal output from the CCD 1 is coincident with any of the patterns corresponding to the bar codes previously stored in the memory 3 and the bar code label is recognized, it is confirmed that the CCD 1 properly reads the bar code on the label. Thus, the identification circuit 2 will supply an "OK" signal to the control circuit 5, to thereby terminate the operation of changing the storage time. Numerical and letter data corresponding to the bar code read are delivered from the identification circuit 2 to an appropriate terminal, for example, a host computer.

The described embodiment is for use in reading bar codes recorded on bar code labels. However, the present invention is not limited to this application, but it is applicable for reading various other codes, for example, Carla code.

Therefore, according to the described embodiment, the light signal storage time is changed, the light signal storage time is fixed when the bar-code reader properly reads so that a bar code recorded on a label attached to merchandise is read positively and in a stable manner.

As having been described in the foregoing, the charge coupled device used in the present invention is designed to have the storage time of incident light changed, the storage time is changed until the change coupled device properly reads a bar code on a label, and then the storage time is fixed. Therefore, even when a bar code is read in an excessively light or dark environment, the distance between the bar code and charge coupled device varies or the distance is such that the bar code is not within the focal distance of the charge coupled device, for example, an optimum storage time is automatically selected for the charge coupled device, so the bar code is read always without any failure in a stable manner.

The present invention does not require a complicated analog circuit, which is very advantageous for reduction of manufacturing costs and for compact design of the bar code reader.

What is claimed is:

1. A method for optically reading a code using a charge coupled device in which a light signal storage time of an incident light signal is adjustable, comprising the steps of:

scanning the code using the charge coupled device and obtaining digital output representative of the scanned code;

discriminating whether the scanned code is properly read by comparing the digital output with stored digital data, which is representative of codes that are scanned, to determine whether there is correspondence with the stored digital data thereby indicating that the scanned code is properly read;

changing the light signal storage time in the charge coupled device when correspondence with the stored digital data is not found and repeating the scanning and discriminating steps until the charge coupled device properly reads the code as indicated by correspondence of the stored digital data with the digital output; and fixing the light signal storage time when correspondence with the stored digital data is found.

2. An apparatus for optically reading a code using a charge coupled device in which a light signal storage time of an incident light signal is adjustable, a scanning device for scanning the code using the charge coupled device and producing digital output representing the scanned code from output of the charge coupled device, the apparatus comprising:

a memory containing stored digital data which is representative of codes that are scanned;

a discriminating device for comparing the digital output with said stored digital data which is representative of codes that are scanned to determine whether there is correspondence with the stored digital data thereby indicating that the scanned code is properly read;

a means for changing the light signal storage time responsive to the comparison device determining that correspondence between the digital output and the stored digital does not exist until the digital output corresponds to the stored digital data; and a controlling means for fixing the light signal storage time in response to an output signal from the discriminating device indicating that the charge coupled device properly reads the scanned code when the digital output corresponds to the stored digital data.

3. A method for optically reading a code using a charge coupled device in which a light signal storage time of an incident light signal is adjustable, comprising the steps of:

setting the light signal storage time to an initial level;

scanning the code optically and applying light reflected from the code to the charge coupled device;

converting an output of the charge coupled device to obtain digital output representative of the scanned code;

providing a memory containing stored data corresponding to codes to be scanned;

discriminating whether the scanned code is properly read by comparing the digital output with stored digital data, which is representative of codes that are scanned, to determine whether there is correspondence with the stored digital data thereby indicating that the scanned code is properly read;

changing the light signal storage time in the charge coupled device when correspondence with the stored digital data is not found and repeating the scanning, the converting and the discriminating steps until the charge coupled device properly reads the code as indicated by correspondence of the stored digital data with the digital output; and fixing the light signal storage time when correspondence with the stored digital data is found.

4. The method of claim 3 wherein the stored digital data represents characters including at least one of numerals and letters.

5. The method of claim 4 wherein the characters of the stored digital data are arranged in an array.

6. The method of claim 3 wherein the light signal storage time is changed between a predetermined number of time intervals.

7. An apparatus for optically reading a code, the apparatus comprising:

a charge coupled device in which a light signal storage time of an incident light signal is adjustable;

a scanning device for scanning the code using a light and applying light reflected from the to the charge coupled device;

a digital converter producing digital output representing the scanned code from output of the charge coupled device;

a memory containing stored digital data which is representative of codes to be scanned;

a discriminating device for comparing the digital output with said stored digital data to determine whether there is correspondence with the stored digital data thereby indicating that the scanned code is properly read;

a means for changing the light signal storage time responsive to the comparison device determining that correspondence between the digital output and the stored digital data does not exist until the digital output corresponds to the stored digital data; and a controlling means for fixing the light signal storage time in response to an output signal from the discriminating device indicating that the charge coupled device properly reads the scanned code when the digital output corresponds to the stored digital data.

8. The apparatus of claim 7 wherein the stored digital data represents characters including at least one of numerals and letters.

9. The apparatus of claim 8 wherein the characters of the stored digital data are arranged in an array.

10. The apparatus of claim 7 wherein the light signal storage time is changed between a predetermined number of time intervals.

* * * * *